No. 891,044.
PATENTED JUNE 16, 1908.
J. H. DARNELL & W. F. KIMBLE.
AUTOMATIC FISHING DEVICE.
APPLICATION FILED MAR. 14, 1908.
2 SHEETS—SHEET 2.
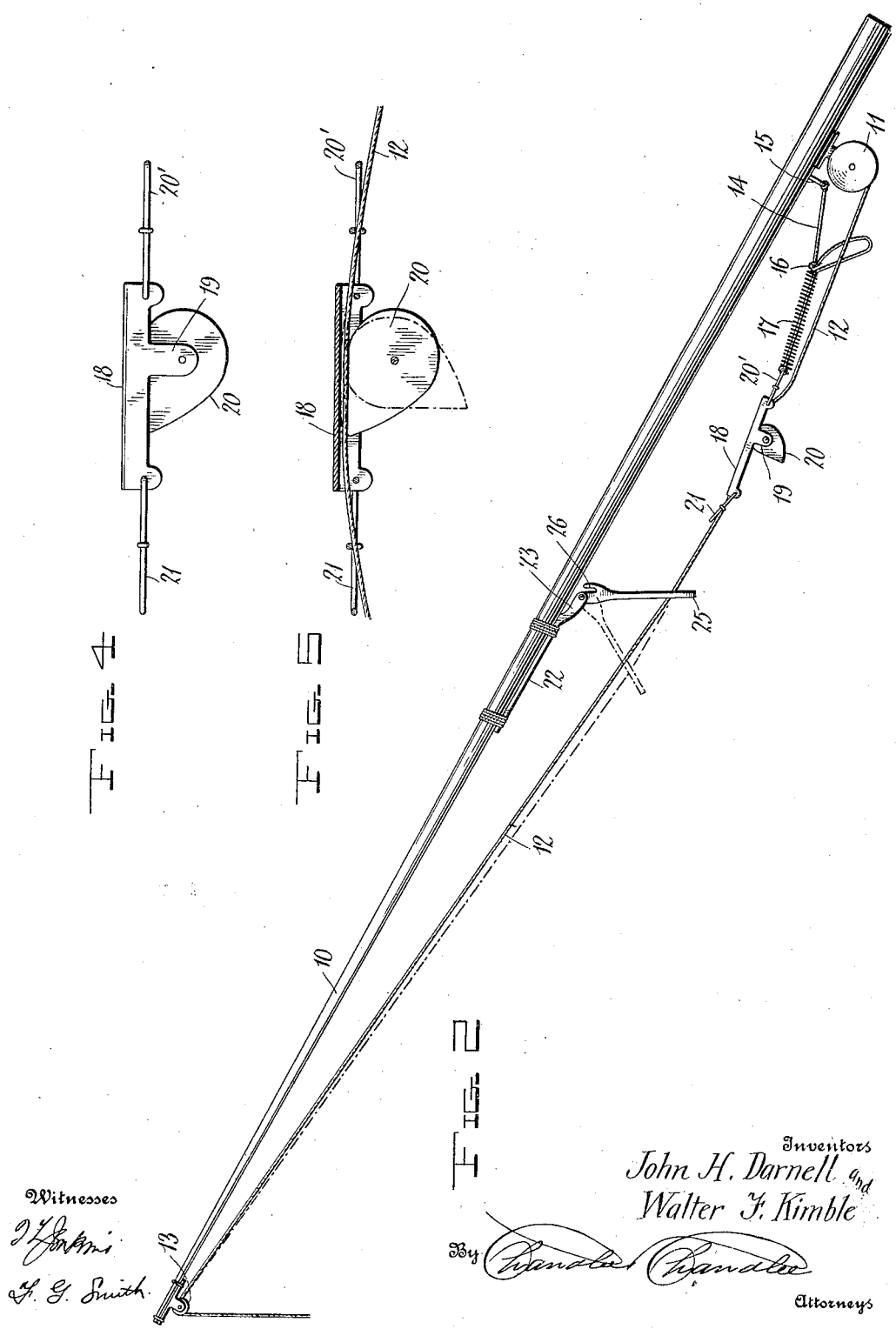
Witnesses
Inventors
John H. Darnell and
Walter F. Kimble
By 
Attorneys

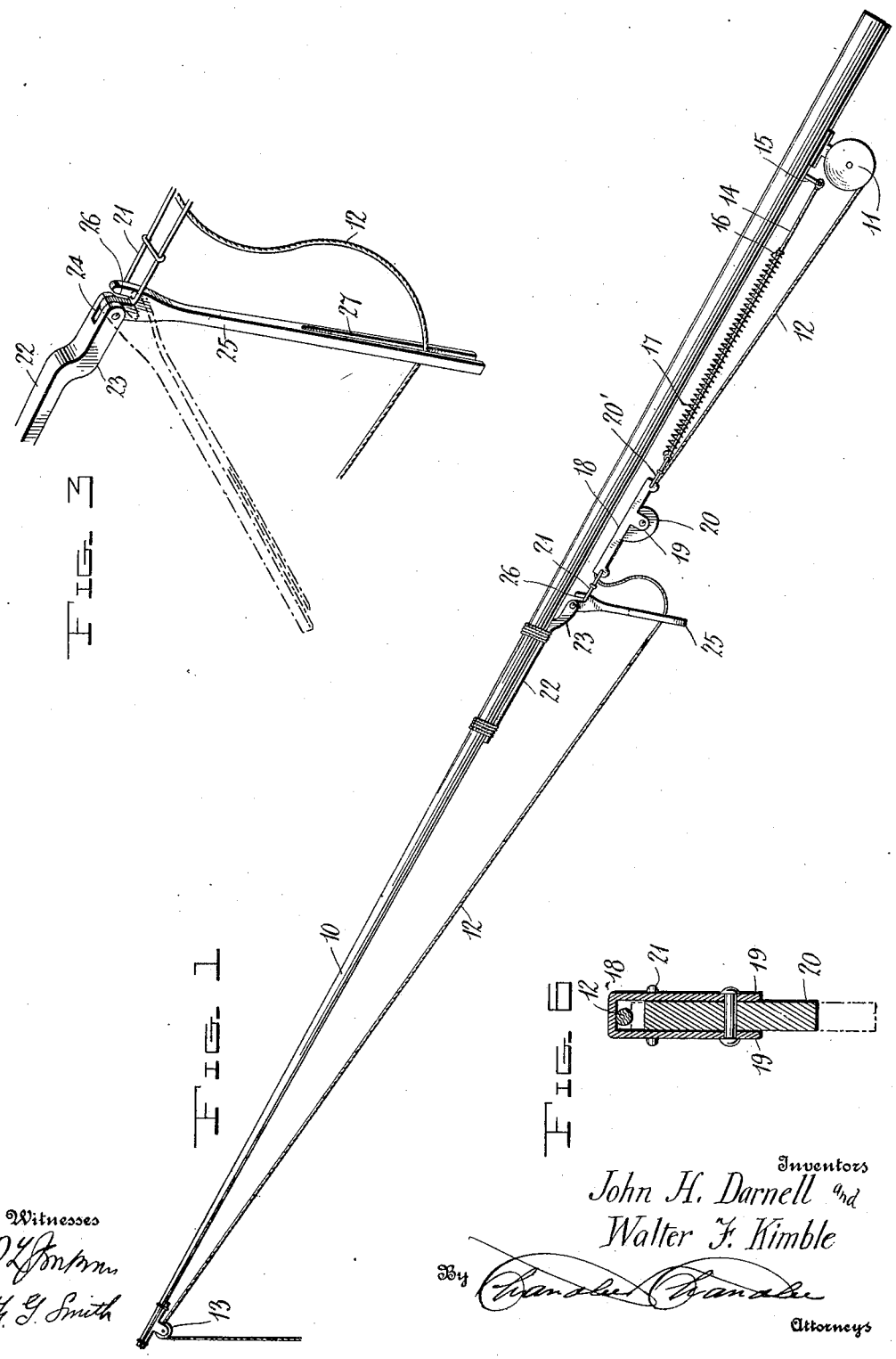

UNITED STATES PATENT OFFICE.

JOHN H. DARNELL AND WALTER F. KIMBLE, OF HANFORD, CALIFORNIA.

AUTOMATIC FISHING DEVICE.

No. 891,044.   Specification of Letters Patent.   Patented June 16, 1908.

Application filed March 14, 1908. Serial No. 421,188.

*To all whom it may concern:*

Be it known that we, JOHN H. DARNELL and WALTER F. KIMBLE, citizens of the United States, residing at Hanford, in the county of Kings, State of California, have invented certain new and useful Improvements in Automatic Fishing Devices; and we do hereby declare the following to be a full, clear, and exact description of the invention, such as will enable others skilled in the art to which it appertains to make and use the same.

This invention relates to automatic fishing devices and more particularly to an automatic fishing rod and has for its object to provide a rod embodying a line pulling mechanism which will be tripped for actuation when the line is disturbed by a fish. The advantage in such a rod lies in the fact that it may be set up and left unattended, thus enabling the sportsman to fish with several rods at a time or may be held in the hand without the necessity of continuously watching a float as is at present customary.

With the present forms of rods and other fishing devices it is necessary for the sportsman to manipulate the rod at exactly the proper moment in order to properly hook the fish but we have aimed, in carrying out our invention, to so construct the line pulling mechanism that it will be tripped at the proper moment and will act immediately when tripped to pull sharply upon the line. In the line pulling mechanism we have embodied a clutch device for firmly gripping the line at the time it is pulled by the line pulling mechanism so that if a reel is employed or if the line is not securely attached to the rod, it will not pay out.

In the accompanying drawings, Figure 1 is a side elevation of the rod the line pulling mechanism being shown with its parts in normal position, Fig. 2 is a similar view but showing the said mechanism sprung, Fig. 3 is a detail perspective view of the trip arm for line pulling mechanism showing in full lines its normal position and in dotted lines its position when actuated, Fig. 4 is a detail side elevation of the line clutching device, Fig. 5 is a vertical longitudinal sectional view therethrough showing in full lines the normal position of the cam clutch and in dotted lines its position after the line pulling mechanism has been actuated, and, Fig. 6 is a vertical transverse sectional view through the said device.

In the accompanying drawings, there is shown a pole 10 to the handle end of which is attached a reel or other line storing device 11 upon which is wound a line 12 which is provided with the usual sinker and hooks (not shown), the said line being trained through a suitable guide at the tip end of the pole, the said guide being here shown as in the form of a small pulley 13 as a guide of this character will allow great freedom of movement of the line and enable it to be easily pulled.

A length of cord 14 is tied at one end to an eye 15 located in advance of the reel or line storing device 11 and is tied with a slip knot to an eye 16 formed at one end of a helical spring 17. The cord is then passed through the spring and tied at its other end to an eye formed at the other end of the spring, the length of cord between the slip knot and its last mentioned tied end being equal to the length of the spring when stretched to a predetermined degree. It will be understood, of course, that should it be desired to adjust the degree to which the spring may be stretched, the slip knot may be loosened and the spring stretched or slackened, and the knot again tightened, it being further understood that when the spring is stretched to a considerable degree, a strong pull will be exerted upon the line 12 under conditions which will be presently explained.

The line clutching device embodied in the invention comprises a channel member 18 which is formed at its longitudinal edges with a pair of ears 19 pivoted between which is a cam 20 the line 12 being threaded through the channel member and between the connecting wall thereof and the edge of the cam, it being understood that the cam may coöperate with this wall to bind the line against pull in a direction toward the tip end of the pole. A link 20′ is connected pivotally to the rear end of the channel member and to the last described eye end of the spring and to the other end of the channel member is connected a similar link 21 which is engageable with a trip arm now to be described. Secured upon the rod 10 near the tip end thereof by means of silk thread wrappings or metallic bands is a short flat metallic bar 22 the rear end of which is turned downwardly and rearwardly as at 23 and bifurcated as at 24. Pivoted between the furcations formed at the said end of the bar is the upper end of a trip arm 25 the said arm being formed in its upper end with a notch 26 in which is engaged the link which is connected to the forward end of the channel member of the line clutching device, it being understood that in order to secure this engagement it is necessary to pull the said device in the direction of the tip end of the rod and against the tension of the spring. The trip arm 25 is formed throughout the greater portion of its length with a kerf 27 into which the line 12 is inserted, the kerf being gradually tapered upwardly so as to adapt it for the engagement therein of lines of different thicknesses.

The operation of the device is as follows:— The line having been properly adjusted, as regards its length, the forward link of the line clutching device is engaged in the notch in the trip arm and the line itself is then engaged in the kerf in the arm, sufficient slack being left to permit of the arm being rocked toward the tip end of the pole. The notch being extended to a point below the pivot point of the arm, the arm will be held inclined slightly rearwardly but when the line is disturbed by a fish nibbling at the bait upon one of the hooks, the pull exerted upon the line will serve to rock the arm forwardly and automatically disengage the link from its notch. The spring heretofore described will then operate to exert a quick jerk and pull upon the line through the medium of the line clutching device, in this manner hooking the fish. As the line is engaged rather tightly in the kerf in the arm, there will be a slight return pull upon the length of line rearwardly of the arm and this pull will cause the cam to turn upon its pivot and tightly bind the line against further pull so that even should the line become disengaged from the kerf, it cannot be unwound from the reel.

What is claimed is:—

1. In an automatic fishing device, the combination with a rod, a guide at the tip of the rod and a line trained through the guide, of a line clutch through which the line is threaded, a spring connected to the clutch for pulling the line through the medium of the clutch, and a trip with which the clutch is engaged, the line being also engaged with the trip whereby a pull upon it will spring the trip and release the clutch for actuation by the spring.

2. In an automatic fishing device, the combination with a rod, a guide at the tip of the rod and a line trained through the guide, of an automatic friction line clutch through which the line is threaded, a spring connected to the clutch for pulling the line through the medium of the clutch, and a trip with which the clutch is engaged, the line being also engaged with the trip whereby a pull upon it will spring the trip and release the clutch for actuation by the spring.

3. In an automatic fishing device, the combination with a rod, a guide at the tip of the rod and a line trained through the guide, of a spring connected to the rod, means at one end of the spring for the attachment of the line, and a trip with which the means is engageable against the tension of the spring, the line being engaged with the trip so that a pull upon the line will spring the trip and release the spring.

4. In an automatic fishing device, the combination with a rod, a guide at the tip end of the rod and a line trained through the guide, of a line clutch through which the line is threaded, a spring connected to the clutch for pulling the line through the medium thereof, and a pivoted trip arm formed with a notch with which one element of the clutch is engageable, the trip arm being also formed with a kerf in which the line is engaged whereby a pull upon the line will swing the trip arm to disengage the clutch and permit actuation of the spring to pull upon the line.

5. In an automatic fishing device, the combination with a rod, a guide at the tip end of the rod and a line trained through the guide, of a line clutch through which the line is threaded, a spring connected to the clutch for pulling the line through the medium thereof, and a pivoted trip arm formed with a notch with which one element of the clutch is engageable, the trip arm being also formed with a kerf in which the line is engaged whereby a pull upon the line will swing the trip arm to disengage the clutch and permit actuation of the spring to pull the line, the kerf in the arm being narrowed from its open to its closed end to permit of engagement therewith of lines of different thicknesses.

6. In an automatic fishing device, the combination with a rod, a guide at the tip of the rod and a line trained through the guide, of a line clutch through which the line is threaded, a spring connected to the clutch for pulling the line through the medium of the clutch, means whereby the tension of the spring may be adjusted, and a trip with which the clutch is engaged, the line being also engaged with the trip whereby a pull upon it will spring the trip and release the clutch for actuation by the spring.

In testimony whereof, we affix our signatures, in presence of two witnesses.

JOHN H. DARNELL.
WALTER F. KIMBLE.

Witnesses:
 Ross W. BUCKNER,
 S. E. RALSBACK.